(12) United States Patent
Agrawal et al.

(10) Patent No.: US 9,021,429 B1
(45) Date of Patent: Apr. 28, 2015

(54) RECOMMENDING APPLICATIONS TO PORTABLE ELECTRONIC DEVICES

(71) Applicants: Anand Agrawal, Pune (IN); Dinesh Kumar, Pune (IN); Ketan Shah, Pune (IN)

(72) Inventors: Anand Agrawal, Pune (IN); Dinesh Kumar, Pune (IN); Ketan Shah, Pune (IN)

(73) Assignee: Sybase Inc., Dublin, CA (US)

( * ) Notice: Subject to any disclaimer, the term of this patent is extended or adjusted under 35 U.S.C. 154(b) by 0 days.

(21) Appl. No.: 14/054,855

(22) Filed: Oct. 16, 2013

(51) Int. Cl.
*G06F 9/44* (2006.01)
*G06F 9/45* (2006.01)
*G06F 9/445* (2006.01)

(52) U.S. Cl.
CPC ........................................ *G06F 8/61* (2013.01)

(58) Field of Classification Search
None
See application file for complete search history.

(56) References Cited

U.S. PATENT DOCUMENTS 7,979,426 B2 * 7/2011 Jeong et al. .................... 707/723

\* cited by examiner

*Primary Examiner* — Chuck Kendall

(57) ABSTRACT

Various embodiments of systems and methods for recommending applications to portable electronic devices are described herein. Initially a context change of an application identification parameter is detected. Based on the detected context change, a target application, from a plurality of applications, may be identified. A similarity value is then computed between the identified target application and another application. Finally, an application to be recommended to a portable electronic device is determined based on the computed similarity value and a rate value of another application.

19 Claims, 12 Drawing Sheets

FIG. 6

RECOMMENDING APPLICATIONS TO PORTABLE ELECTRONIC DEVICES

BACKGROUND

The number of portable electronic devices, for example smartphones, have grown exponentially in recent years. Additionally and in parallel, the number of applications, for example mobile applications, supported by these portable electronic devices have also been rapidly growing since the inception of portable electronic device. These applications, once installed on a portable electronic device, may provide several functionalities to a user of the portable electronic device.

To address to the growing demand of applications, application providers develop hundreds of thousands of applications that may be downloaded at the portable electronic devices. However, due to the large number of available applications the users of the portable electronic devices may be overwhelmed when searching for relevant applications for their devices. Determining relevant applications for installing at a portable electronic device may therefore be confusing and time consuming.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 6 is an exemplary user interface screen of a publisher interface, according to an embodiment.

DETAILED DESCRIPTION

Embodiments of techniques for recommending applications to portable electronic devices are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
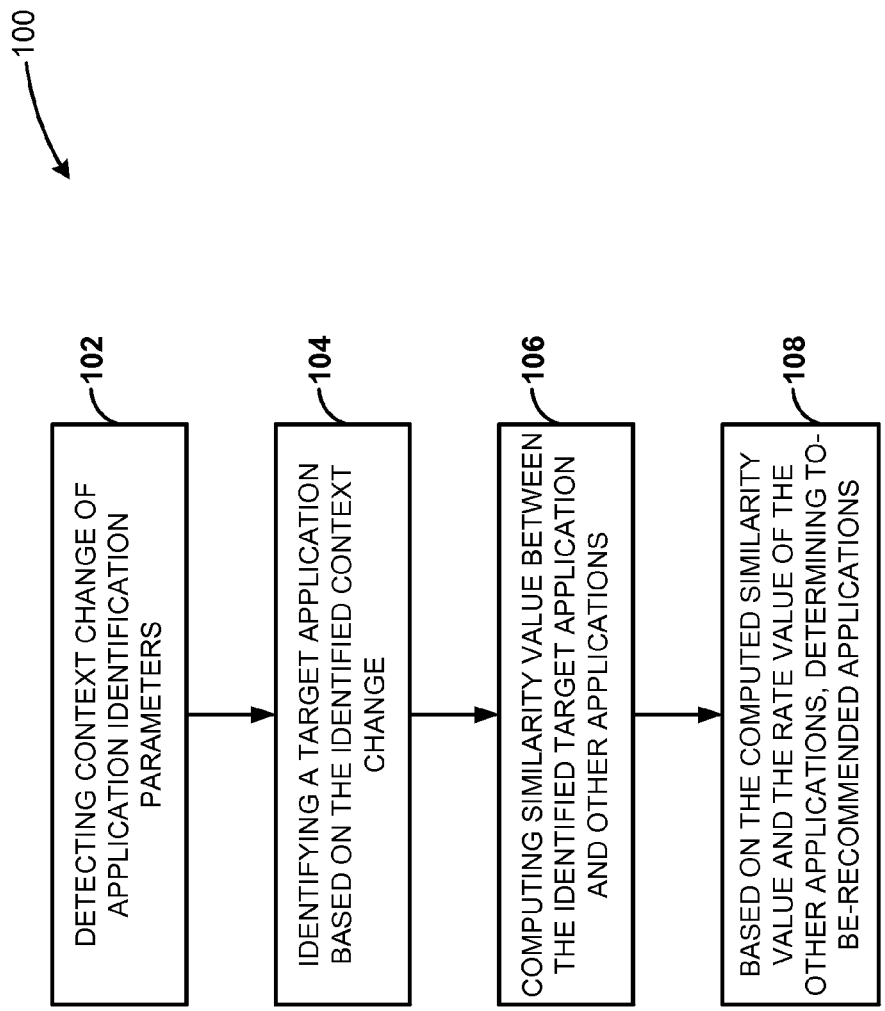
FIG. 1 is a flow diagram illustrating a process to recommend applications to a portable electronic device, according to an embodiment.

FIG. 1 is a flow diagram illustrating a process 100 to recommend applications to a portable electronic device, according to an embodiment. A portable electronic device may be a handheld or wearable electronic device, for example, mobile phones, tablet computers, laptops, personal digital assistant, etc. The portable electronic device may include several applications that may help a user perform different tasks. An application or an "app" is computer software designed to help the user of a portable electronic device to perform specific tasks. For example, a financial application may help a user perform financial calculations on the portable electronic device. In one embodiment, the portable electronic device may include pre-installed application. A user of the portable electronic device may also install applications from different application sources. Application recommendation may help a user of the portable electronic device to choose the applications that the user may want to install on the portable electronic device. In one embodiment, the application recommendation may include a list of potential applications that the user may want to install at the portable electronic device.

For recommending applications to a portable electronic device, initially at 102, context change of application identification parameters is detected. An application identification parameter may be any observable occurrence or phenomenon. For example, hour of the day, current date, month, weather condition, physical location of a user, proximity of a user to a Wi-Fi network, etc. may be application identification parameters. A context may represent a value for a particular application identification parameter. For example, the context of a "location" application identification parameter may be home, office, or any other location of the user. A context change may represent a change in value for the application identification parameter. For example, a context change of the "location" application identification parameter may be when user moves from a "home" (location) to "office" (location). The context of the different application identification parameters may be monitored to detect context change of a particular application identification parameter.

Next at 104, a target application is identified based on the detected context change at 102. In one embodiment, a target application is an application associated with a particular context of an application identification parameter. For example, a financial or banking application that helps users perform tax calculation and other financial calculations may be associated with the "financial year end" context of the "time of year" application identification parameter. Identifying the target application may include identifying the application associated with the changed context, detected at 102, of the application identification parameter. In the example discussed in the previous paragraph, a "finance assistant" application associated with the changed context "office" of the "location" application identification parameter may be identified.

Next at 106, a similarity value is computed between the identified target application and other applications. Other applications may be applications other than the target application, identified at 104. A similarity value is a measure of similarity between the identified application and other applications. In one embodiment, the similarity value may be computed based on comparing several attributes, for example, application tags, application category, etc., of the identified target application and the other application. In the example described in the previous paragraph, the identified "finance assistant" application may include application tags "finance", "calculator", "currency converter", "loan comparator", and "profit". A similarity value may be determined between the "finance assistant" target application and two other applications: a "banking" application that includes application tags "finance", "banking", "profit", "balance amount", and "fund transfer"; and a "market live" application that includes application tags "finance", "market", "stocks", "profit", and "portfolio". Based on comparing the application tags, the similarity value between the "finance assistant" application and the "banking" application may be determined as 0.9, and between the "finance assistant" application and "market live" application may be determined as 0.6. The similarity value may be determined using different similarity value determination process, for example, Pearson-r correlation method.

Finally at 108, the to-be-recommended applications are determined, based on the computed similarity value and rate value of other applications. The to-be-recommended applications may be applications that are recommended to the portable electronic device. In one embodiment, a rate value may indicate a positive or negative recommendation for the application by the target user. The rate value and the similarity value of other applications are used to determine the to-be-recommended applications for the portable electronic device.

In the example described with respect to 102, assume that the rate values for the "banking" application and the "market live" application are 4 and 3, respectively. In this case, based on the product of rate value and the computed similarity value, the "banking" application is determined as to-be-recommended application for the portable electronic device. The to-be-recommended application may be forwarded to the portable electronic device. A user of the portable electronic device may then discard the recommended application or install the received recommended application.

Determining to-be-recommended application based on context change of application identification parameters and rate values of application, ensures that user's environment and user's preference, respectively, are considered to determine the application recommendations for the user.

Figure 2A:
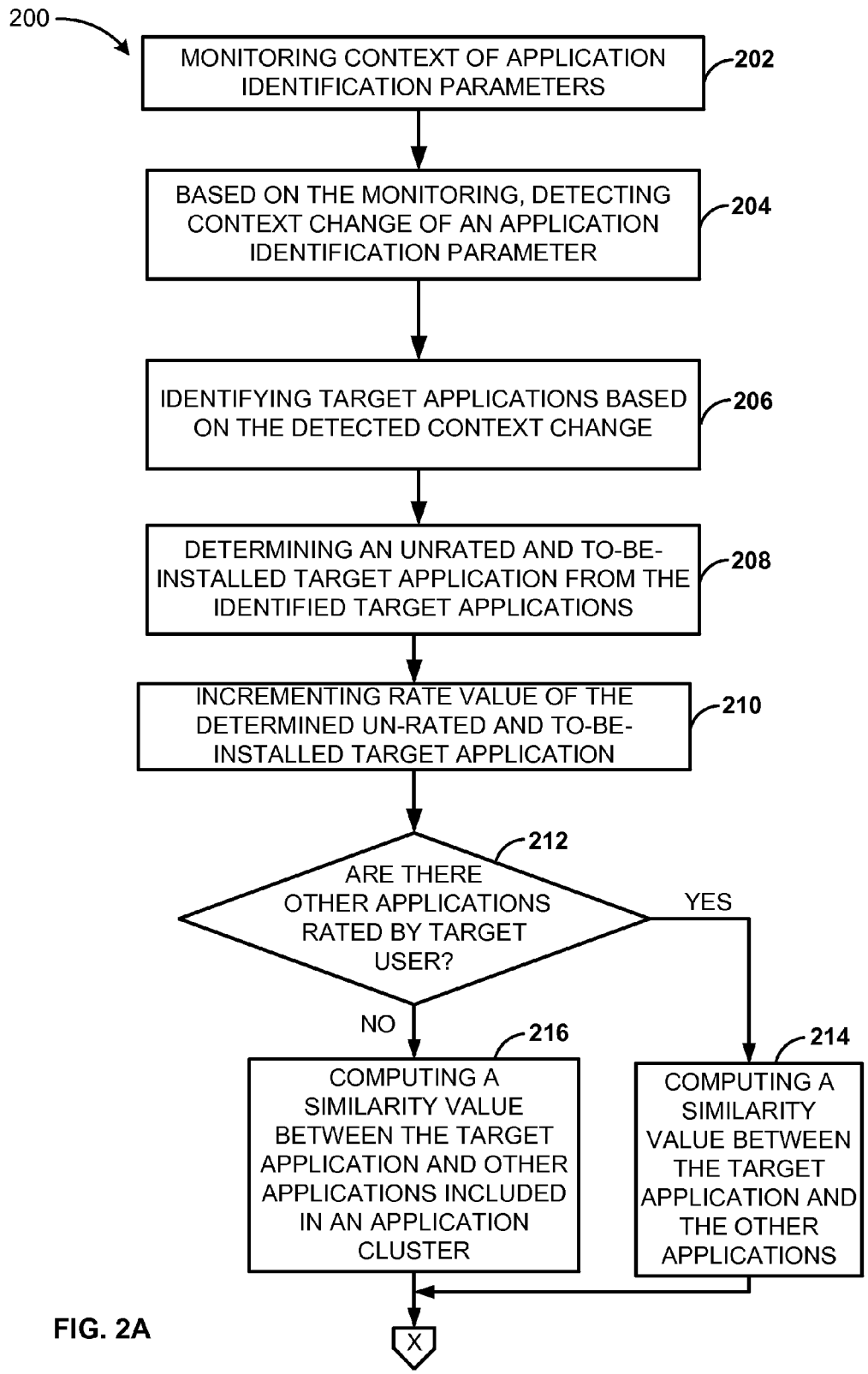
FIGS. 2A-2C is a detailed flow diagram illustrating a process for recommending applications to portable electronic device, according to an embodiment.
Figure 2B:
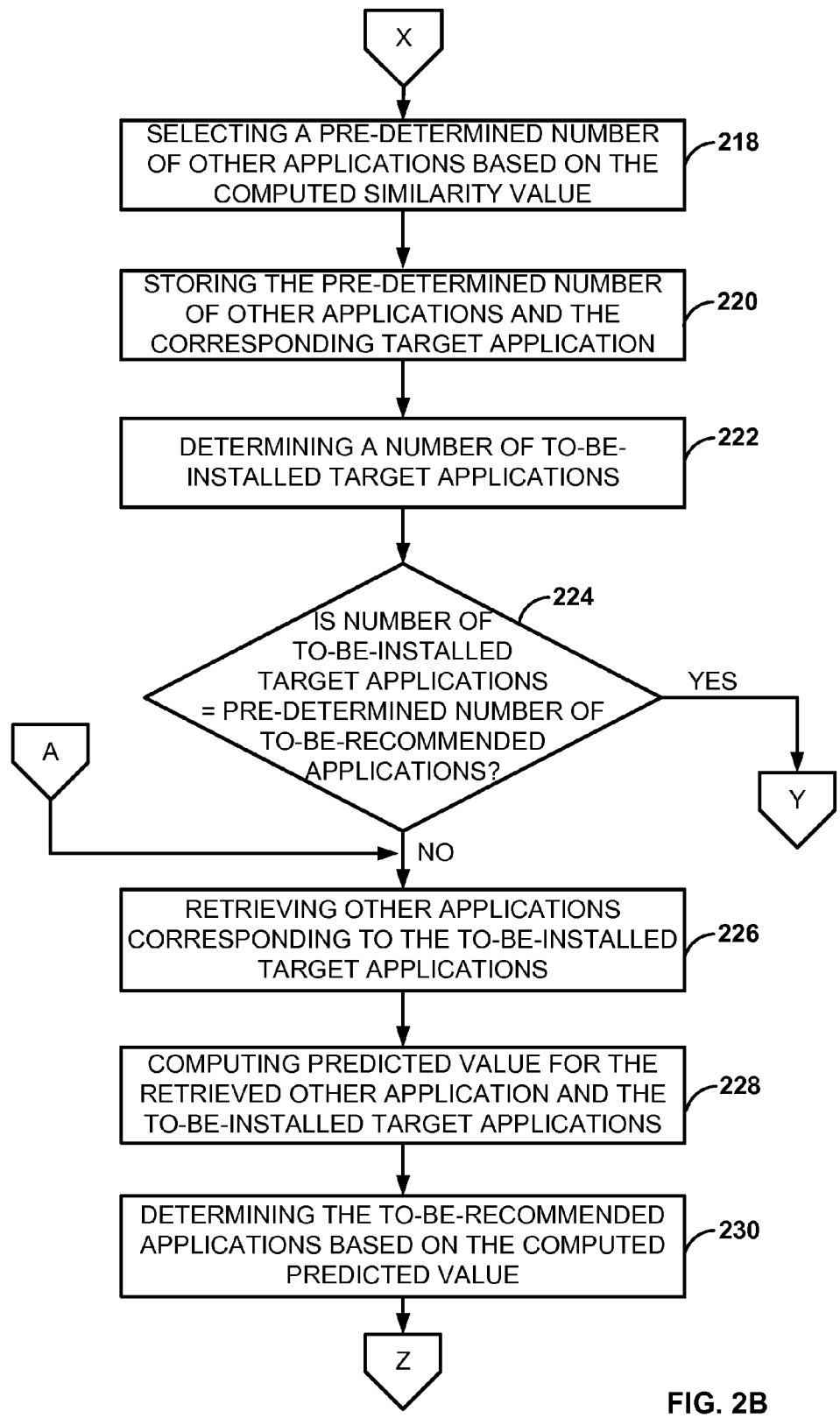
Figure 2C:
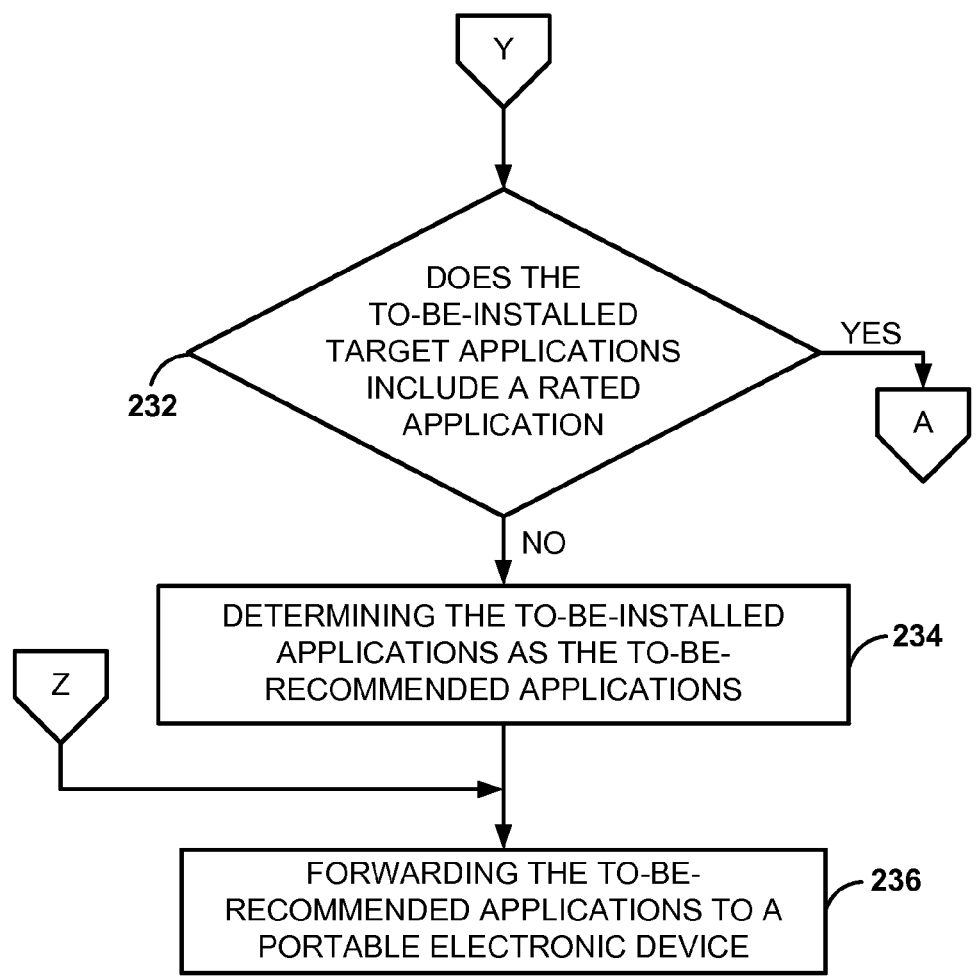

FIGS. 2A-2C is a detailed flow diagram illustrating a process 200 for recommending applications to portable electronic device, according to an embodiment. The recommended applications may help user decide the applications that the user may want to install on the portable electronic device. Initially at 202, contexts of several applications identification parameters may be monitored. A context is a value of a particular application identification parameter. For example, an application identification parameter may be "location" application identification parameter. A context of the "location" application identification parameter may be "home", when the user of the portable electronic device is at home. In one embodiment, the context of the application identification parameters may be constantly monitored without user's intervention.

Next at 204, based on the monitoring, at 202, context change of an application identification parameter is detected. A context change may represent a change in value of the application identification parameter. In one embodiment, the context change may be detected for several application identification parameters, based on the monitoring at 202. In the example described in the previous paragraph, the user may travel to other city ABC, due to which the context of the "location" application identification parameter changes from "home" to "city ABC".

Next at 206, based on the context change detected at 204, a target application may be identified. A target application is an application corresponding to the changed context, detected at 204, of the application identification parameter. In the example described in the previous paragraph, a "city ABC map" application may be identified. In one embodiment, several target applications may be identified corresponding to the context change detected at 204. In the example described in the previous paragraph, several target applications may be identified corresponding to the changed context "city ABC" of the "location" application identification parameter.

In another example, a context of a "weather" application identification parameter may change from "summer" (context) to "winter" (context). In this case, a "ski resorts" application, "winter garments outlet" application, and "winter driving" application may be identified as target applications corresponding to the changed context "winter" of the "weather" application identification parameter. In one embodiment, a target application may be detected corresponding to context change of several application identification parameters. For example, based on the context change of a "location" application identification parameter from "home" to "city ABC" and a "time" application identification parameter, which detects the time elapsed since the user is away from their "home" location, from "zero" hours to "twenty four" hours, a "hotels in city ABC" target application may be identified.

In one embodiment, the relationship between context of an application identification parameter and corresponding target application may be pre-determined. For example, a pre-determined relationship between application identification parameter and application may be that when the context of "weather" application identification parameter is "summer" then the corresponding application is "beach resorts" application. The pre-determined relationship between the context of the application and the corresponding target application is used for identifying the target application.

Next at 208, an un-rated and to be installed target application from the target application, identified at 206, is detected. The un-rated and to-be-installed application may be detected from the several target applications identified at 206. In one embodiment, an un-rated target application is an application that has not been rated by a target user. The target user may be a user of the portable electronic device. A rate value may indicate a positive or negative recommendation for the application by the target user. A rate value is an evaluation or assessment of a particular item, in terms of quantity or quality or any other parameter. In one embodiment, the rate value may be provided, for example, on a scale of −1 to 5. A rate value of 5 may represent that a user has positively rated the application. The user may rate the application positively in terms of several parameters, for example, "relevance", "ease of use", "application size", etc. Rate values of 1-4 represent explicit rate values provided by the user for the application, where a higher rate value represents a more positive feedback by the user. In one embodiment, a rate value of 2 is automatically assigned to the application, when the application is installed to the portable electronic device. A rate value of 0 implies that an application is an un-rated application. A rate value of −1 represents a negative recommendation by the user for the application.

In one embodiment, a to-be-installed target application is a target application that has not been installed at the portable electronic device. An unrated, i.e., application with rate value 0, that has not been installed at the portable device is determined from the target application identified at 206. Next at 210, the rate value of the un-rated and to-be-installed target application, determined at 208, is incremented. In one embodiment, the rate value of the un-rated and to-be-installed target application is incremented by 1. In the example described with respect to 206, assume that the "winter driving" application is the un-rated and to-be-installed application from among the three target applications corresponding to the "winter" context of the "weather" application identification parameter. In this case, the rate value of the "winter driving application" is incremented by 1.

Next at 212, a check is performed to determine whether there are other applications rated by the target user. Other applications may include applications different from the target application identified at 206. In one embodiment, other application may be a co-rated application with respect to the target application. Two applications are co-rated when both the applications are rated by same user. The same user may be the target user or any other user. The other application co-rated with respect to the target application may also be rated by the same user. In case other application rated by the target user exist (condition in 212 is true), a similarity value may be computed, at 214, between the target application and the other applications, determined at 212. A similarity value is a measure of similarity between a target application and the other application. In one embodiment, the similarity value may be individually computed between target application and the determined other applications. For example, consider that there are two target applications ($a_1$, $a_2$) and two other applications ($o_1$, $o_2$) rated by the target user. In this case, four similarity values ($S_{a1o1}$, $S_{a1o2}$, $S_{a2o1}$, and $S_{a2o2}$) may be computed between the target applications ($a_1$, $a_2$) and the other applications ($o_1$, $o_2$). Computing similarity values between target application and other co-rated applications reduces the number of other applications for which the similarity values are computed. This reduces the time for computing the similarity value between the target applications and other applications. In the example described with respect to 206, assume that there are two other applications, "ice museum" application and "winter park" applications, and three target applications, "ski resorts" application, "winter garments outlet" application, and "winter driving" application, rated by the same user. In this case, six similarity values may be computed between the three target applications and the two other applications.

In one embodiment, the similarity value may be computed based on the similarity between attributes of identified application and other application. The attributes of an application may include, for example, target Operating System on which the application is supported (for example: iOS®, Android®, etc.), an application kind (for example: whether application is a free application or a paid application), category to which the application belongs (for example: banking, games, news, educational, etc.), application type (native or container based), application tag, etc. Applications of native application type are executed using Operating System of the portable electronic device whereas applications of container application type may use custom containers for execution. Application tag provides the information about an application. The similarity value may be computed, for example, based on the similarity between the target Operating Systems, kind, category, application type, and/or tags of the target application and the other application.

In one embodiment, the similarity value between target application and other application may be computed using any similarity computation method, for example, cosine based similarity method, adjusted cosine similarity method, or correlation based similarity method. For cosine based similarity, the identified application and other application are considered as two vectors. A cosine based similarity method measures similarity between the target application vector and the other application vector by computing the cosine of the angle between the target application and other application. Two vectors with the same orientation have a cosine similarity value of 1, two vectors at 90° have a similarity value of 0, and two vectors diametrically opposite to each other have a similarity value of −1. Based on the cosine based similarity method, the similarity value between the target application and other application may be 1, 0, or −1.

The correlation based similarity $S_{ij}$ between two applications i and j, respectively, rated by the target user, may be computed by determining the Pearson-r correlation between the target application and other application. Pearson-r correlation is a measure of the linear correlation (dependence) between the target application i and other application j, giving a value between +1 and −1 inclusive, where 1 is total positive correlation, 0 is no correlation, and −1 is negative correlation. The Pearson-r correlation may be computed using the following formula:

$$S{i,j} = \frac{\sum_{u \in U}(R_{u,i} - \overline{R}_I)(R_{u,j} - \overline{R}_J)}{\sqrt{\sum_{u \in U}(R_{u,i} - \overline{R}_I)^2} \sqrt{\sum_{u \in U}(R_{u,j} - \overline{R}_J)^2}}$$

where $R_{u,i}$ is the rate value received from the target user u for the application i, $\overline{R}_i$ is the average rate value of the application i, and $\overline{R}_{u,j}$ is the rate value received from the target user u for the application j and $\overline{R}_j$ is the average rate value of the application j.

In case, other application rated by the target user is not identified (condition in 212 is false) then the similarity value is computed between the target application and other application included in an application cluster at 216. An application cluster may be a group of applications grouped based on a particular attribute. For example, applications may be grouped in two application clusters based on two application categories "education" and "games", respectively. In this case, the two application clusters include applications with application category "education" and "games", respectively.

In one embodiment, the similarity value is computed between the target application and other applications of an application cluster that includes the target application. The similarity value may be computed between the target application and other co-rated applications in the application cluster. In this case, the target application and the other co-rated application have been rated by another user different from the target user. The application cluster may be checked to identify other co-rated application. The similarity value may then be computed individually between the target application and the other co-rated application included in the application cluster. The similarity value may be computed using the different similarity computation methods discussed above with respect to 214. In the example described above with respect to 206, assume that there are two application clusters grouped according to the application categories "sports" and "business". In this case, the "ski resorts" application and "winter driving" application may be included in the application cluster corresponding to the "sports" category. Similarly, the "winter garments outlet" application may be included in the application cluster corresponding to the "commerce" category. A similarity value may be computed between the target "ski resorts", "winter driving" application and other co-rated application included in the application cluster corresponding to the "sports" category. Similarly a similarity value may be computed between the "winter garment" application and the other co-rated application included in the application cluster corresponding to the "commerce" category.

Next at 218 (FIG. 2B), based on the computed similarity value, a pre-determined number of other applications corresponding to the target application may be identified. The pre-determined number of other applications may be selected from the other applications, the similarity value of which are computed at 214 and 216, with respect to the target application. In one embodiment, other applications may be arranged in descending order based on the computed similarity values between the target application and other applications. The pre-determined number of other application may then be selected from the beginning of the obtained list of other application. In one embodiment, the pre-determined number of other applications may represent a minimum number of other applications similar to the target application. Next at 220, the pre-determined number of other applications, selected at 218, may be stored. The target application and the corresponding pre-determined number of other applications may be stored together in a database. In one embodiment, the target application, the corresponding other applications, and the similarity value of other applications with respect to the target application may be stored together.

In one embodiment the similarity value may be pre-computed, before monitoring context of the application identification parameters at 202. During the pre-computation process: similarity values may be computed between the applications, corresponding to different application identification parameters, and the other application, a pre-determined number of the other applications may then be selected based on the determined similarity value, and the selected pre-determined number of other applications, corresponding to an application, may be stored along with their similarity values. In this case the other applications corresponding to the target application, identified at 206, may be retrieved, and then used for determining the application recommendation. Pre-computing other application corresponding to a target application reduces computation time for determining the similarity value, after a context change of application identification parameter is detected, and therefore reduces the time for determining applications recommendation.

Next at 222, a number of to-be installed target applications are determined. The number of to-be-installed applications may be a count of the number of target applications that are not installed at the portable electronic device. Next at 224, the determined number of to-be-installed applications is compared with a pre-determined number of to-be-recommended applications. In one embodiment, the pre-determined number of to-be-recommended applications is the maximum number of application recommendations that may be sent to the portable electronic device. The comparison is performed to determine whether the number of to-be-installed applications is equal to the pre-determined number of to-be-recommended applications.

In case the number of to-be-installed target applications is not equal to the pre-determined number of to-be-recommended applications (condition in 224 is false) then a pre-determined number of other applications corresponding to the to-be-installed target application may be retrieved. In one embodiment, the other applications, stored at 220, corresponding to the to-be-installed target application may be retrieved. For example, consider that six target applications are identified and one of these target application is installed at the portable electronic device. Assume that the five to-be-installed target applications have six other applications stored corresponding to these applications. Further, assume that the pre-determined number of application recommendations that may be sent to the portable electronic device is 2. In this case, as the number of to-be-installed target applications (5) is not equal to the pre-determined number (2) of target applications therefore, the six other applications corresponding to the five to-be-installed target applications may be retrieved.

Next at 228, predicted value is computed for the retrieved other applications and the to-be-installed target applications. A predicted value represents a likelihood of the application to be relevant for recommendation to the portable electronic device. The predicted value for the other application is computed based on the similarity value of the other application with respected to the target application, and the rate value of the other application. In one embodiment, rated other application, from among other applications retrieved at 226, are identified. A rated other application may be one or more of other applications, retrieved at 226, that has a rate value. The predicted value may be computed for the rated other application and the to-be-installed target application. In the example described in the previous paragraph, the predicted value may be computed for the six other applications and the five to-be-installed target applications.

The predicted value for the to-be-installed identified application is determined based on the rate value of the to-be-installed identified application. In this case, the similarity value of the to-be-installed application is considered as 100% or 1. In one embodiment, the predicted value may be determined based on any prediction computation method, for example, weighted sum method or the regression method. In the weighted sum method, the rate value $R_{u,j}$ of other application j is weighted by the corresponding similarity value $s_{i,j}$ between other application j and the target application i. The obtained value is then divided by the sum of the similarities $s_{i,j}$ between the other applications j and the target application i, to obtain the predicted value $P_{u,i}$ for an application "i" rated by a target user u. The predicted value $P_{u,i}$ may be computed using the following formula:

$$P_{u,i} = \frac{\sum_{j=1 \to n}(s_{i,j} \times R_{u,j})}{\sum_{j=1 \to n}(|s_{i,j}|)}$$

where "n" in the number of applications similar to i.

Similarly in the regression method approximation of rate value, instead of the actual rate value provided to the rated other applications, are used for determining the predicted value. Next at 230, the to-be-recommended applications are determined based on the predicted value computed at 228. In one embodiment, the rated other applications and the to-be-installed target applications are arranged in descending order of the corresponding predicted value. A pre-determined number of applications from the beginning of the arranged applications are then determined as the to-be-recommended application. The pre-determined number, used for determining the to-be-recommended application, may be the pre-determined maximum number of to-be-recommended applications. In the example described with respect to 228, the six other applications and the five to-be-installed target applications may be arranged according to the corresponding predicted value of these applications. In this case, assume that the pre-determined number of to-be-recommended applications is five, then five applications from the arranged eleven applications, six other applications and the five to-be-installed target applications, may be determined as the to-be-recommended applications.

In one embodiment, when the number of to-be-installed identified application is equal to the predetermined number of to-be-recommended applications (condition in 224 is true) then a check is performed to determine whether the to-be-installed identified application include a rated application, at 232 (FIG. 2C). A rated application is an application rated by the target user or any other user. In case the to-be-installed identified application include a rated application (condition in 232 in true) then the steps in 226-230 are repeated to determine the to-be-recommended applications. Alternatively, when the to-be-installed application does not include a rated application (condition in 232 in false) then the to-be-installed identified application is determined as the to-be-recommended application (234).

Finally at 236, the to-be-recommended applications, determined at 230 and 234, are forwarded to the portable electronic device. The user of the portable electronic device may then install the received recommended application or reject the received application recommendation.

Figure 3:
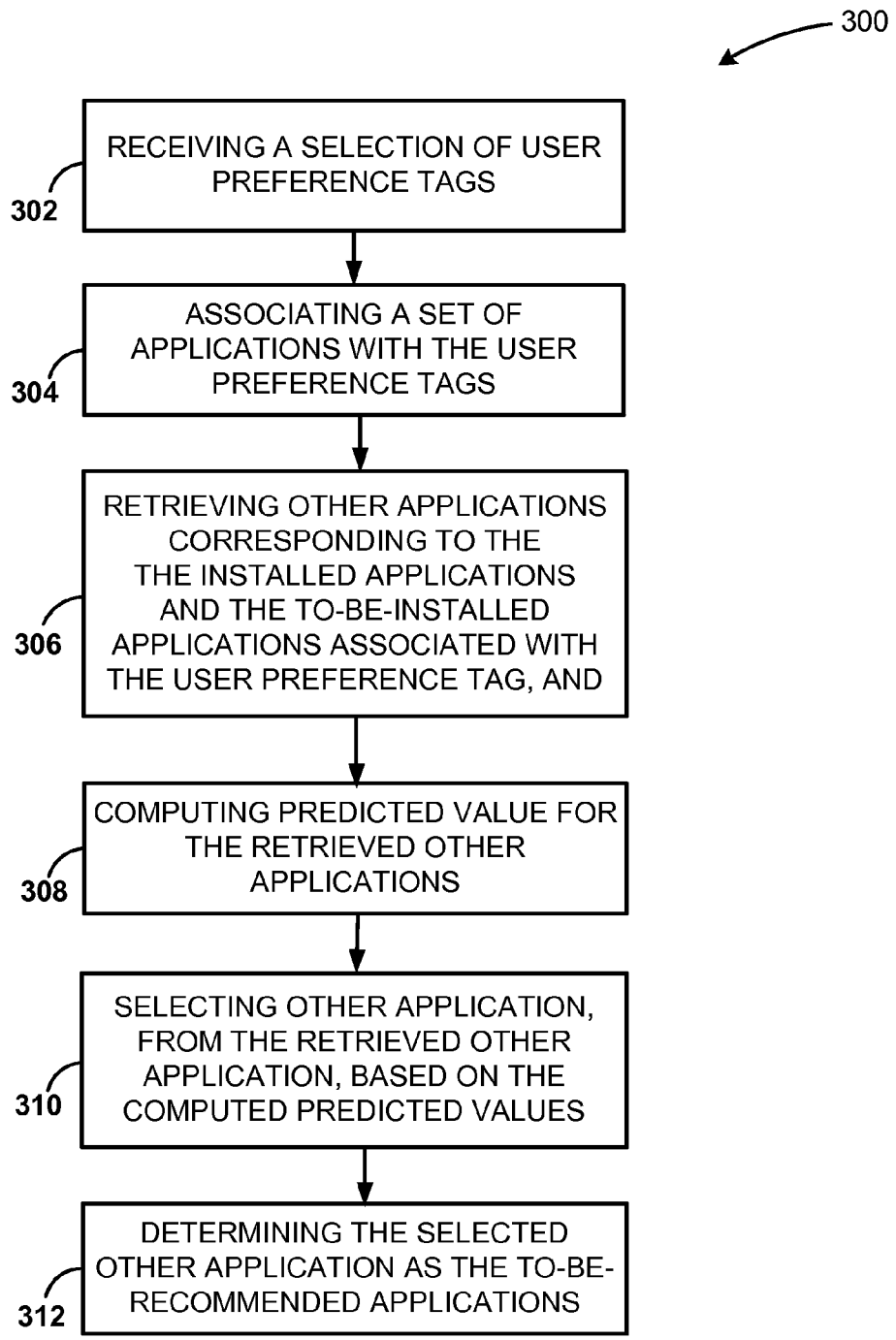
FIG. 3 is a flow diagram illustrating a process for recommending applications at pre-determined time intervals, according to an embodiment.

FIG. 3 is a flow diagram illustrating a process 300 to recommend applications at pre-determined time intervals, according to an embodiment. In one embodiment, an application recommendation determination process for determining application recommendations may be triggered either based on the context change of application identification parameters or at pre-determined time intervals. The application recommendation determination process may also be triggered by a user of the portable electronic device. In this case, the user can trigger the application recommendation process by selecting a "refresh recommendations" option at the portable electronic device. The user has an option to select between the different application recommendation generation triggering options. When the application identification parameter option is selected for triggering the application recommendation generation process, the to-be-recommended applications may be determined according to the process described in FIGS. 2A-2C.

When the pre-determined time option is selected for triggering application recommendation generation process, a user of the portable electronic device may be requested to provide a time at which the user wants to trigger the determination of application recommendation. In one embodiment, for the time based application recommendation determination processes, 302 and 304 may be executed before triggering the application recommendation generation process. Further, 306-312 may be executed when the application recommendation generation process is triggered. Initially at 302, a selection of user preference tags is received. The selection of the user preference tags may be received at the portable electronic device from a user of the portable electronic device. A user at the portable electronic device may manually select the user preference tags. User preference tags are tags that define the user's preferences for applications. For example, a user's preference tag may be "sports" and "live", in this case sports channels that broadcast "live" sports matches may be the applications that the user prefer to receive as recommendation. Next at 304 a set of applications may be associated with the user preference tags. In one embodiment, the set of applications are automatically associated with the user preference tags. For example, an "ABC sports channel" application, and a "XYZ sports channel" application may be automatically associated with the user preference tags "sports" and "live".

Next at 306, the other applications corresponding to installed applications and to-be-installed application associated with the user preference tag, respectively, are retrieved. The installed applications may be the applications installed at the portable electronic device. In one embodiment, the pre-determined number of other applications, stored at 220 of FIGS. 2A-2C, corresponding to the installed applications may be retrieved at 306. For retrieving the to-be-installed application associated with the application tag, the applications, associated with the user preference tag, which have not been installed at the portable electronic device may be identified. The other applications corresponding to the identified to-be-installed applications associated with the user preference tag may then be retrieved.

Next at 308, a predicted value is computed for other applications retrieved at 306. The predicted value may be computed based on the rate value of other applications and the similarity value of other applications with respect to the installed applications and the to-be-installed applications associated with the user preference tag, respectively. The predicted value may be computed using one of the different prediction value generation options described in reference to 228 of FIGS. 2A-2C.

Next at 310, other applications, from applications retrieved at 306, are selected based on the predicted value computed at 308. The other applications, retrieved at 306, may be arranged in descending order of the corresponding predicted value. A pre-determined number of the other applications may be selected at 310. The pre-determined number may be the maximum number of applications that may be recommended to the portable electronic device.

Finally at 312, the selected other application are determined as the to-be-recommended applications. The determined to-be-recommended application may be forwarded to the portable electronic device.

Figure 4:
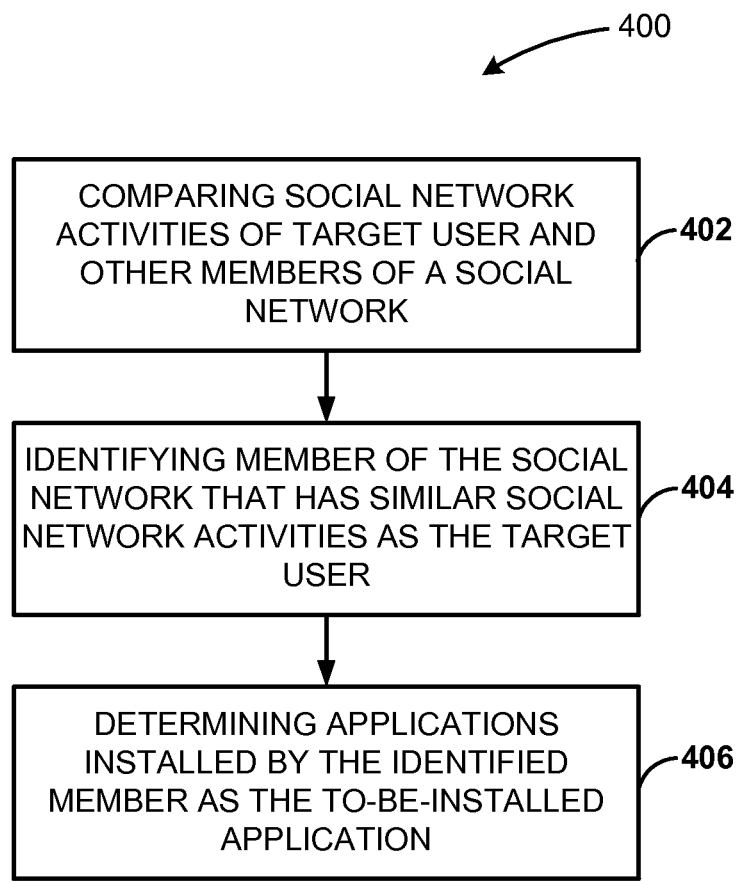
FIG. 4 is a flow diagram illustrating a process for recommending applications based on social network, according to an embodiment.

FIG. 4 is a flow diagram illustrating a process 400 for recommending applications based on social network, according to an embodiment. A social network, for example, Facebook™, allows a target user to connect with other members of the social network based on online identities of the members. An online identity may be a social identity that the target user establishes in online communities and websites. Further, members of the social network may perform activities, such as providing recommendation for applications or installing a particular application, using their online identities. The social network's platform may store the social network activities and the corresponding online identity of the member that performed the activities.

Initially at 402, the social network activities of the target user and members of the social network are compared. The social network activities may include installing applications, providing recommendations for a particular application, etc.

Comparing the social network activities may include comparing applications downloaded by the target user and any other member on the social network, comparing applications rated by the target user and members of the social network, etc. In one embodiment, comparing the social network activities may include comparing whether similar applications have been downloaded by the target user and any other member on the social network, etc. Similar applications may include applications having some attributes same as the attributes of the applications installed by the target user. Based on the comparison at 402, a member of the social network that has performed similar network activities as the target user is identified at 404. The identified member of the social network may have installed same applications as the target user or may have provided feedback for the same applications as the user. For example, a target user may have downloaded a "car racing" game or may have rated a Formula 1® race. In this case, any other member that has downloaded the "car racing" game or have rated the Formula 1® race may be identified.

Finally at 406, the applications installed by the identified member are determined as to-be-recommended applications. In one embodiment, the applications installed by the identified member that has not been installed by the target user of the portable electronic device are determined as the to-be-recommended application.

Figure 5:
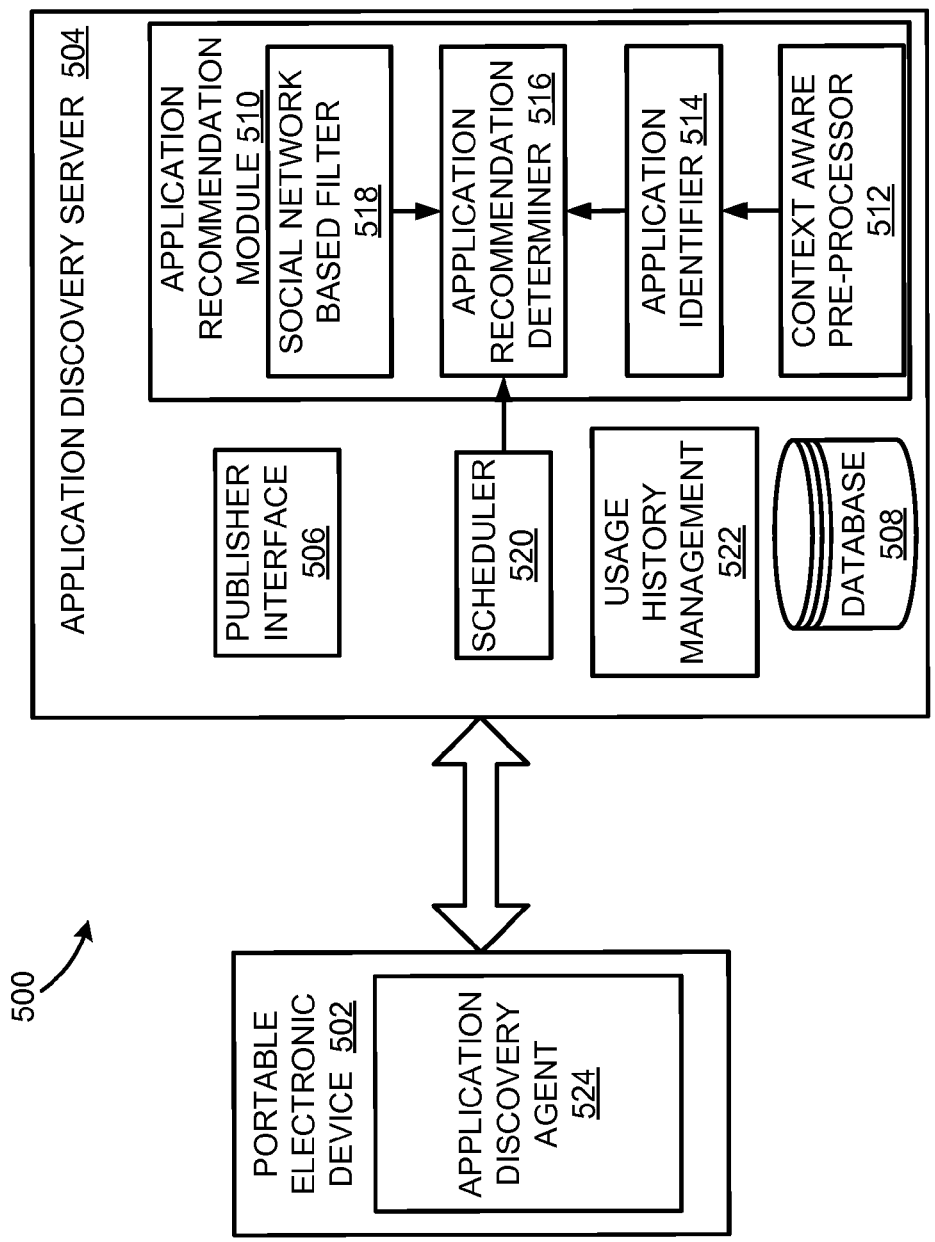
FIG. 5 is a block diagram illustrating an application recommendation management system for providing application recommendations to a portable electronic device, according to an embodiment.

FIG. 5 is a block diagram illustrating an application recommendation management system 500 for providing application recommendations to a portable electronic device 502, according to an embodiment. In one embodiment, the application recommendation management system 500 includes an application discovery server 504 that manages the applications recommendation process. The application discovery server 504 includes a publisher interface 506 that allows a user to define attributes for a particular application. In one embodiment, the publisher interface receives the application attribute values for the different attributes, for example, application name, target Operating System, application thumbnail image, a short text describing the application, application category, application tags, and scope. The scope of the application defines whether the application is restricted to a group or is a public application.

The publisher interface 506 may also receive a request to upload the application to the application discovery sever 504. In one embodiment, the uploaded application may be stored in a database 508 included in the application discovery server 504. The publisher interface 506 may also receive a link to an application store that may be used for installing the application. An application store, for example, Google Play™ store or Apple® App Store™ is a digital distribution platform for application software. The application store link, for a recommended application, may be forwarded to the portable electronic device along with the recommended application. A user of the portable electronic device may download the application, from the application store, using the received application store link.

The publisher interface 506 allows a user to select application discovery parameters for an application. The application discovery parameters are parameters based on which an application may be discovered at a portable electronic device. In one embodiment, the application discovery parameters are application identification parameters that may be used for identifying an application. For example, a "location" application discovery parameter selected by the user may be an application identification parameter. When the location parameter is selected then the user may be requested to provide an application coordinates, at which the application is discoverable. When the target user reaches the application coordinates (context), defined for the "location" application identification parameters, then the corresponding application is identified as a target application. In one embodiment, the selected application discovery parameters may be used for determining the similarity value of the target application with respect to the other applications. For example, when an application tag parameter is selected as the application discovery parameter then application tag is one of the parameters used for determining similarity values between the application and other application. Similarly, when the user's usage history options is selected then user's past actions like frequently visited locations by the user, notification received by the user, actions taken per notification, applications installed by user, frequency of application installation by user, etc., may be considered for determining the to-be-recommended applications.

In one embodiment, the application discovery parameter may allow a user to select an application recommendation triggering mode for triggering the application recommendation determination process. The application recommendation triggering mode may include a system triggered mode and a user triggered mode. In case the system triggered mode is selected by the user, the application may be discovered based on an identified context change for an application identification parameter, or based on the identified other applications similar to installed applications at pre-determined times. In case, the user triggered option is selected then the user may trigger the application recommendation generation process by selecting a recommendation search/recommendation refresh option at the portable electronic device.

The application discovery server 504 includes an application recommendation module 510 that determines the to-be-recommended applications for the portable electronic device. The application recommendation module 510 includes a context aware pre-processor 512 that detects context change of different application identification parameters. The context aware pre-processor 512 then provides the changed context of the application identification parameter to an application identifier 514. An application identifier 514, included in the application recommendation module 510, then identifies the application corresponding to the received context of application identification parameters. An application recommendation determiner 516, included in the application recommendation module, then computes the similarity value between the identified application and other applications, and the predicted value of other applications as discussed with respect to FIGS. 2A-2C. The application recommendation determiner 516 may then determine the to-be-recommended applications based on the computed predicted value as discussed with respect to FIGS. 2A-2C.

The application recommendation module 510 also includes a social network based filter 518 that identifies other members of a social network that have similar social network activities as the target user. The social network based filter 518 then provides the list of applications installed by the other member to the application recommendation determiner 516 that determines the received list of applications as the to-be-installed application.

In one embodiment the application discovery server 504 includes a scheduler 520 that sends an application recommendation generation request to the application recommendation determiner 516 at pre-determined intervals or when a user of the portable electronic device sends a "refresh application recommendation" request. The application recommendation determiner 516 then generates the to-be-recommended applications based on the applications installed at the portable electronic device and the user preference tags selected by the user. The application discovery server 504 may also include a user's usage history management module 522 that stores user related information, for example, frequently visited location by user, notifications received by user, actions taken by user per notification, etc. The stored user related information is provided to the application recommendation module 510 for determining the to-be-recommended applications.

The application recommendation management system 500 also includes an application discovery agent. In one embodiment, the application discovery agent 524 may be included in the portable electronic device 502. The application discovery agent 502 may forward a received rate value of application from the portable electronic device 502 to the application discovery server 504 for determining the to-be-recommended applications. The application discovery agent 524 also receives the to-be-recommended applications forwarded to the portable electronic device 502. The application discovery agent 524 also monitors context of the different application identification parameters and provides this information to the context aware pre-processor 512. The received to-be-recommended applications may then be displayed at a user interface of the portable electronic device 502.

Figure 6:
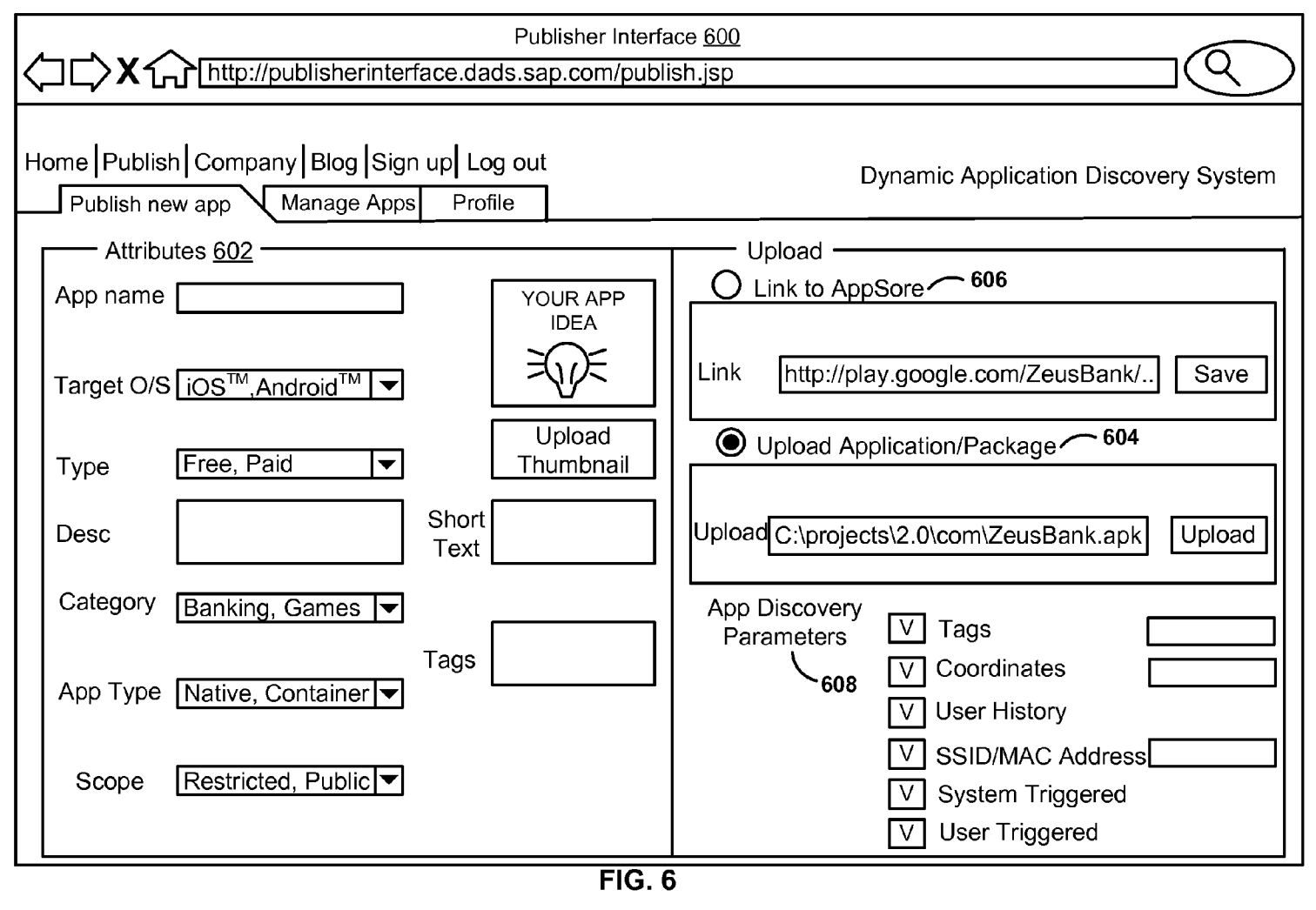

FIG. 6 is an exemplary user interface screen of a publisher interface 600, according to an embodiment. The publisher interface 600 allows the user to provide application attribute values for different application attributes 602, for example: application name, target Operating System, type, category, application type, or scope. The publisher interface also allows a user to upload an application 604 from a particular location to the application discovery server. Further, the publisher interface 600 allows a user to provide an application store link 606, which may allow a target user to download the application from the application store. The publisher interface 600 may also allow a user to select application discovery parameters 608 for the application.

Figure 7:
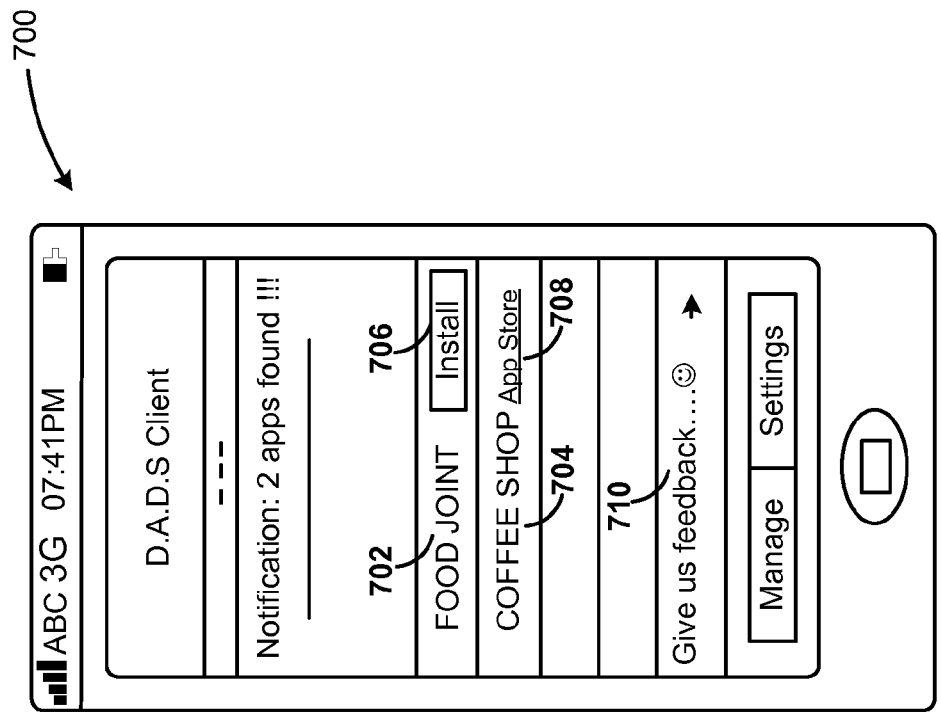
FIG. 7 is an exemplary user interface of a portable electronic device displaying applications recommended for the portable electronic device, according to an embodiment.

FIG. 7 is an exemplary user interface 700 of a portable electronic device displaying applications recommended for the portable electronic device, according to an embodiment. The user interface 700 of the portable electronic device displays two applications, "Food Joint" application 702 and "COFFEE SHOP" application 704, which have been recommended to a user of the portable electronic device. In one embodiment, the "Food Joint" application 702 can be installed 706 directly from the "Food Joint" application stored in the application discovery server. The "Coffee Shop" application 704 may be installed by using the application store link 708 that allows the user to download the application from the application store. In one embodiment, the user is also provided a feedback option 710 to provide feedback for the applications 702 and 704. The user can provide a rate value, as feedback, for the application.

Figure 8:
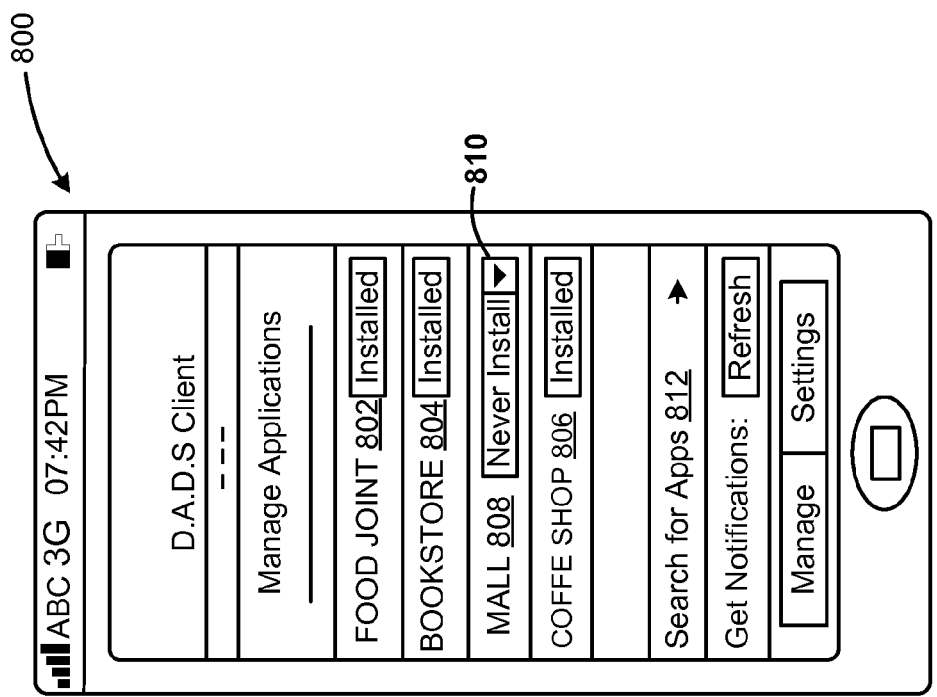
FIG. 8 is an exemplary user interface of a portable electronic device for managing applications, according to an embodiment.

FIG. 8 is an exemplary user interface 800 of a portable electronic device for managing applications, according to an embodiment. As shown the user interface 800 displays the installed applications "FOOD JOINT" 802, "BOOK STORE" 804, and "COFFEE SHOP" 806. The user interface 800 also displays a recommended application "MALL" 808, which is recommended for installation, at the portable electronic device. In one embodiment, the user may choose a "never install" option for the "recommended MALL" application 808. In this case, the "MALL" application 808 may not be recommended again to the portable electronic device. The portable electronic device may also allow provide a "search for apps" option 812 to manually trigger the application recommendation generation process.

Figure 9:
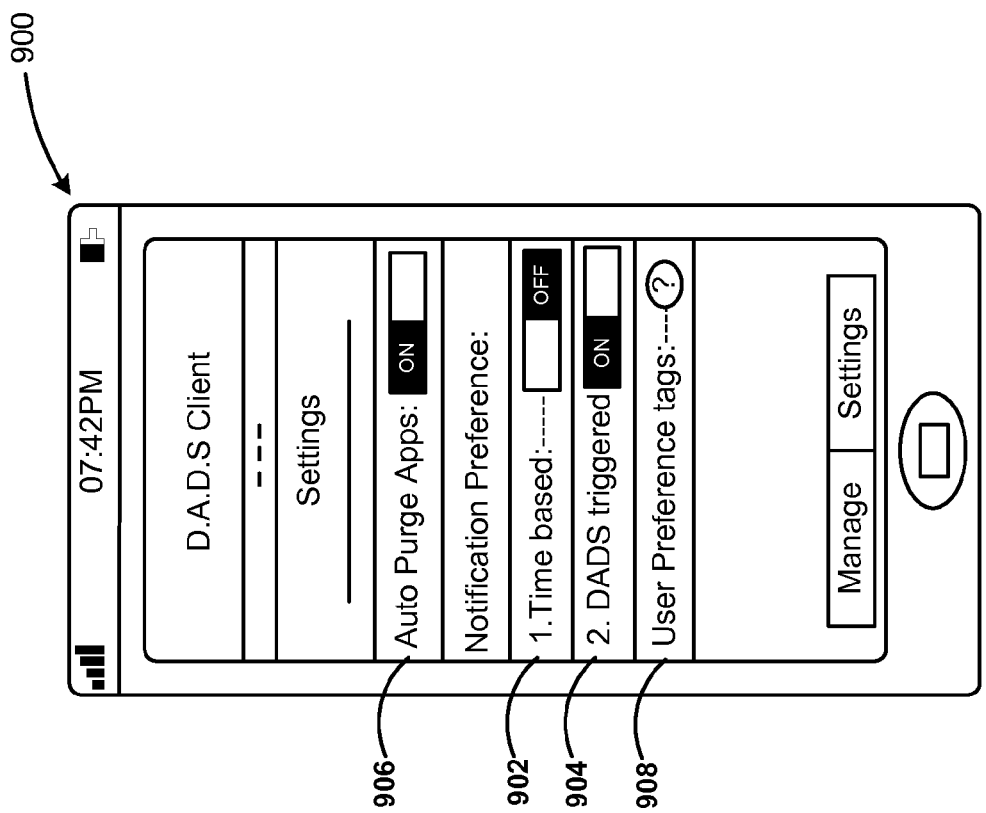
FIG. 9 is an exemplary user interface of a portable electronic device displaying application recommendation generation options and application management settings for the portable electronic device, according to an embodiment.

FIG. 9 is an exemplary user interface 900 of a portable electronic device displaying application recommendation generation options and application management settings for the portable electronic device, according to an embodiment. The application recommendation generation options displayed at the user interface 900 may allow a user to select a "time based" application recommendation generation option 902 or an application identification parameter (AIP) triggered application recommendation generation option 904. In case, the "time based" application recommendation generation option 902 then the application recommendation generation may be triggered at pre-determined times. In case, the application identification parameter (AIP) triggered application recommendation generation option is selected then application recommendation generation process is triggered whenever the context of an application identification parameter changes. The application management settings at the user interface 900 may also allow a user to select an "auto purge apps" option 906. When the "auto purge apps" option 906 is selected then the applications that are not relevant to the context are automatically purged. Further, the user may also provide user preference tags 908 at the user interface 900 of the portable electronic device.

Some embodiments may include the above-described methods being written as one or more software components. These components, and the functionality associated may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 10:
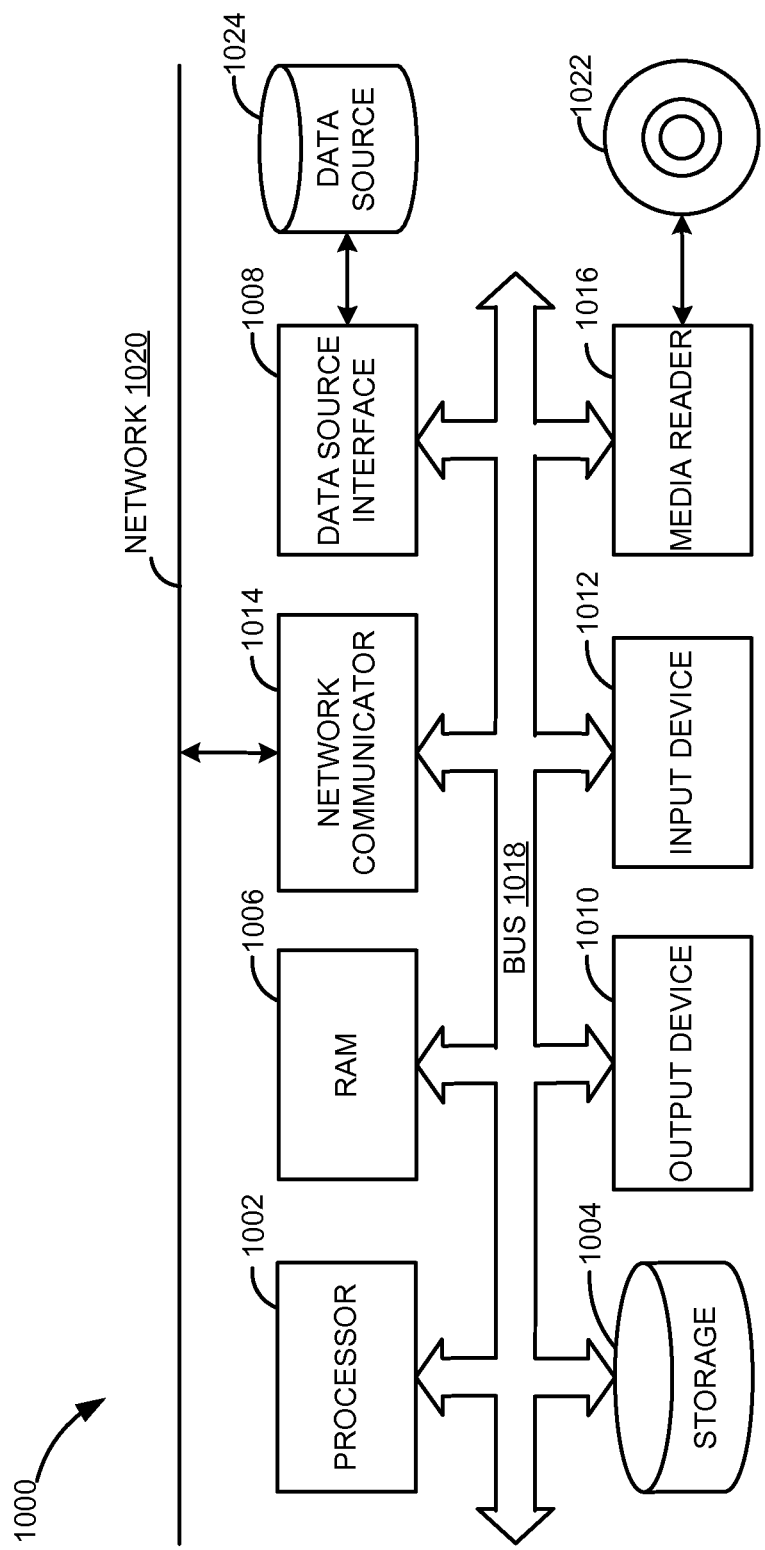
FIG. 10 is a block diagram illustrating a computing environment in which the techniques described for recommending applications to portable electronic devices can be implemented, according to an embodiment.

FIG. 10 is a block diagram of an exemplary computer system 1000. The computer system 1000 includes a processor 1002 that executes software instructions or code stored on a computer readable storage medium 1022 to perform the above-illustrated methods. The processor 1002 can include a plurality of cores. The computer system 1000 includes a media reader 1016 to read the instructions from the computer readable storage medium 1022 and store the instructions in storage 1004 or in random access memory (RAM) 1006. The storage 1004 provides a large space for keeping static data where at least some instructions could be stored for later execution. According to some embodiments, such as some in-memory computing system embodiments, the RAM 1006 can have sufficient storage capacity to store much of the data required for processing in the RAM 1006 instead of in the storage 1004. In some embodiments, the data required for processing may be stored in the RAM 1006. The stored instructions may be further compiled to generate other representations of the instructions and dynamically stored in the RAM 1006. The processor 1002 reads instructions from the RAM 1006 and performs actions as instructed. According to one embodiment, the computer system 1000 further includes an output device 1010 (e.g., a display) to provide at least some of the results of the execution as output including, but not limited to, visual information to users and an input device 1012 to provide a user or another device with means for entering data and/or otherwise interact with the computer system 1000. Such output devices 1010 and input devices 1012 could be joined by one or more additional peripherals to further expand the capabilities of the computer system 1000. A network communicator 1014 may be provided to connect the computer system 1000 to a network 1020 and in turn to other devices connected to the network 1020 including other clients, servers, data stores, and interfaces, for instance. The modules of the computer system 1000 are interconnected via a bus 1018. Computer system 1000 includes a data source interface 1008 to access data source 1024. The data source 1024 can be accessed via one or more abstraction layers implemented in hardware or software. For example, the data source 1024 may be accessed by network 1020. In some embodiments the data source 1024 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for determining a to-be-recommended application for a portable electronic device, the method comprising:
    detecting, by a processor of a computer, context change of an application identification parameter from a plurality of application identification parameters;
    based on the detected context change, identifying a target application, from a plurality of applications stored in a memory of the computer;
    determining another application, from the plurality of applications, co-rated with respect to the identified target application, wherein the other application co-rated with respect to the target application and the identified target application are rated by same user;
    based on the determination, computing, by the processor of the computer, a similarity value between the identified target application and the other application co-rated with respect to the target application; and
    based on the computed similarity value and a rate value of the other application, determining the to-be-recommended application, from the plurality of applications, for the portable electronic device.

2. The computer implemented method of claim 1, further comprising:
    based on the computed similarity value and the rate value of the other application, computing, by the processor of the computer, predicted value for the other application; and
    based on the computed predicted value, determining the to-be-recommended application, from the plurality of applications, for the portable electronic device.

3. The computer implemented method of claim 1, further comprising:

based on attribute of the plurality of applications, grouping, by the processor of the computer, the plurality of applications into one or more application clusters;

identifying, by the processor of the computer, an application cluster, from the plurality of application clusters, corresponding to the target application;

computing, by the processor of the computer, a similarity value between the target application and another application included in the identified application cluster; and based on the computed similarity value and a rate value of the other application included in the identified application cluster, determining the to-be-recommended application, from the plurality of applications, for the portable electronic device.

4. The computer implemented method of claim 1, further comprising:

determining, by the processor of the computer, an unrated target application, from the identified target application; and determining, by the processor of the computer, the unrated target application as the to-be-installed target application.

5. The computer implemented method of claim 1, further comprising:

comparing, by the processor of the computer, one or more applications downloaded by members on a social network with an application downloaded by the user of the portable electronic device;

based on the comparison, identifying, by the processor of the computer, a member, from the plurality of members, that has downloaded the application downloaded by the user of the portable electronic device; and determining, by the processor of the computer, an application downloaded by the identified member as the to-be-recommended application.

6. The computer implemented method according to claim 1, further comprising:

receiving, at a user interface of the computer, application attributes values for the target application; and based on the received application attribute values, computing, by the processor of the computer, the similarity value between the target application and the other application.

7. The computer implemented method according to claim 1, further comprising:

at pre-determined time intervals, determining the plurality of to-be-recommended applications.

8. The computer implemented method according to claim 1, further comprising:

forwarding the to-be-recommended application to the portable electronic device; and based on instructions received from user, installing, by the processor of the computer, the to-be-recommended application.

9. A computer system for determining a to-be-recommended application for a portable electronic device, the computer system comprising:

a processor to execute program code; and a memory coupled to the processor, the memory storing the program code comprising:

a context aware pre-processor to detect context change of an application identification parameter from a plurality of application identification parameters;

an application identifier to identify a target application, from a plurality of applications stored in a memory of the computer, based on the detected context change; and an application recommendation determiner, in communication with the application identifier, to:

determine another application, from the plurality of applications, co-rated with respect to the identified target application, wherein the other application co-rated with respect to the identified target application and the identified target application are rated by same user;

based on the determination, compute a similarity value between the identified target application and the other application co-rated with respect to the target application; and based on the computed similarity value and a rate value of the other application, determine the to-be-recommended application, from the plurality of applications, for the portable electronic device.

10. The computer system according to claim 9, further comprising:

a scheduler to trigger determination of the to-be-recommended application at a pre-determined time.

11. The computer system according to claim 9, further comprising:

a publisher interface module to receive application attribute values for the target application.

12. The computer system according to claim 9, further comprising:

a discovery agent, at the portable electronic device, for receive the to-be-installed application forwarded to the portable electronic device.

13. An article of manufacture including a non-transitory computer readable storage medium to tangibly store instructions, which when executed by a computer, cause the computer to:

detect context change of an application identification parameter from a plurality of application identification parameters;

based on the detected context change, identify a target application, from a plurality of applications;

determine another application, from the plurality of applications, co-rated with respect to the identified target application, wherein the other application co-rated with respect to the target application and the identified target application are rated by same user;

based on the determination, compute a similarity value between the identified target application and the other application co-rated with respect to the target application; and based on the computed similarity value and a rate value of the other application, determine a to-be-recommended application, from the plurality of applications, for the portable electronic device.

14. The article of manufacture according to claim 13, further comprising instructions which when executed by the computer further causes the computer to:

based on the computed similarity value and the rate value of the other application, compute predicted value for the other application; and based on the computed predicted value, determine the to-be-recommended application, from the plurality of applications, for the portable electronic device.

15. The article of manufacture according to claim 13, further comprising instructions which when executed by the computer further causes the computer to:

based on attribute of the plurality of applications, group the plurality of applications into one or more application clusters;

identify an application cluster, from the plurality of application clusters, corresponding to the target application;

compute a similarity value between the target application and another application included in the identified application cluster; and based on the computed similarity value and a rate value of the other application included in the identified application cluster, determine the to-be-recommended application, from the plurality of applications, for the portable electronic device.

16. The article of manufacture according to claim 13, further comprising instructions which when executed by the computer further causes the computer to:

determine an unrated target application, from the identified target application; and determine the unrated target application as the to-be-installed target application.

17. The article of manufacture according to claim 13, further comprising instructions which when executed by the computer further causes the computer to:

compare one or more applications downloaded by members on a social network with an application downloaded by the user of the portable electronic device;

based on the comparison, identify a member, from the plurality of members, that has downloaded the application downloaded by the user of the portable electronic device; and determine an application downloaded by the identified member as the to-be-recommended application for the user.

18. The article of manufacture according to claim 13, further comprising instructions which when executed by the computer further causes the computer to:

receive application attributes values for the target application; and based on the received application attribute values, compute the similarity value between the target application and the other application.

19. The article of manufacture according to claim 13, further comprising instructions which when executed by the computer further causes the computer to:

at pre-determined time intervals, determining the plurality of to-be-recommended applications.

* * * * *